United States Patent
van Lieshout et al.

(10) Patent No.: US 8,952,911 B2
(45) Date of Patent: Feb. 10, 2015

(54) ELECTRONIC DEVICE WITH A TOUCH SENSITIVE PANEL, METHOD FOR OPERATING THE ELECTRONIC DEVICE, AND DISPLAY SYSTEM

(75) Inventors: Pieter van Lieshout, Eindhoven (NL); H. E. A. Huitema, Eindhoven (NL); Johannes Cornelis Adriaan Hamers, Eindhoven (NL)

(73) Assignee: Creator Technology B.V., Breda (NL)

( * ) Notice: Subject to any disclaimer, the term of this patent is extended or adjusted under 35 U.S.C. 154(b) by 213 days.

(21) Appl. No.: 13/570,189

(22) Filed: Aug. 8, 2012

(65) Prior Publication Data
US 2014/0043244 A1    Feb. 13, 2014

(51) Int. Cl.
*G06F 3/041*    (2006.01)

(52) U.S. Cl.
USPC ........... 345/173; 345/174; 345/175; 345/176; 345/177; 345/178; 349/56; 361/679.01; 361/679.02

(58) Field of Classification Search
USPC .................................. 349/56; 345/173–179; 361/679.01–679.29
See application file for complete search history.

(56) References Cited

U.S. PATENT DOCUMENTS

| | | | |
|---|---|---|---|
| 5,506,375 A * | 4/1996 | Kikuchi | 178/18.07 |
| 2005/0052582 A1* | 3/2005 | Mai | 349/12 |
| 2005/0094053 A1* | 5/2005 | Byun | 349/58 |
| 2009/0026932 A1* | 1/2009 | Kwak et al. | 313/504 |

* cited by examiner

*Primary Examiner* — Srilakshmi K Kumar
*Assistant Examiner* — Linh N Hoffner

(57) ABSTRACT

An electronic display device being arrangeable during use into one of at least an opened and a closed state. The device includes a deformable display panel having an active area, a periphery area adjacent the active area, and a drive circuit for driving the active area. The active area includes an active area conductive structure substantially arranged along a front side of the active area. The periphery area includes a frame structure for visually bounding the active area. The frame structure is conformal to the display panel. The frame structure is electrically conductive and an insulator structure is provided between the active area conductive structure and the conductive frame structure. The insulator structure insulates the active area conductive structure from frame structure, the conductive frame structure being arranged to thereby shield the active area against ESD damage.

22 Claims, 15 Drawing Sheets

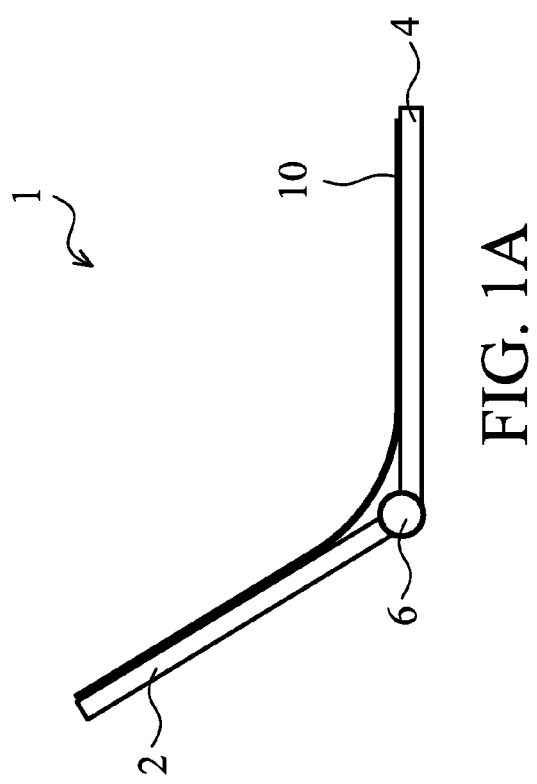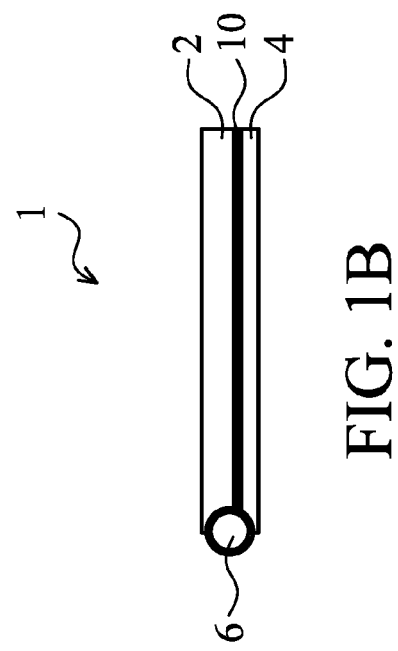
FIG. 1A
FIG. 1B

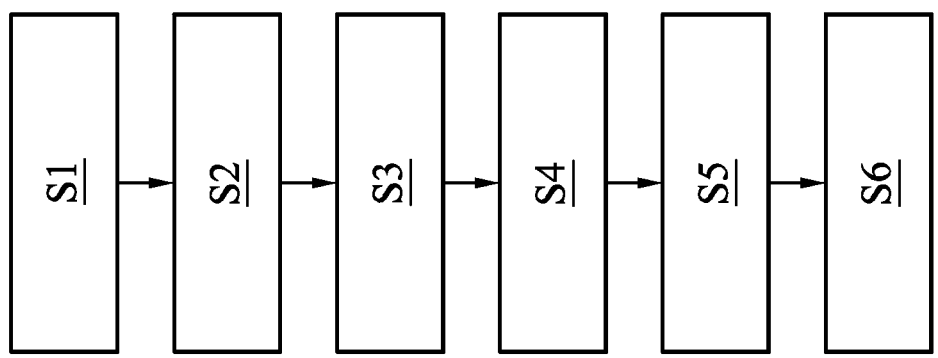

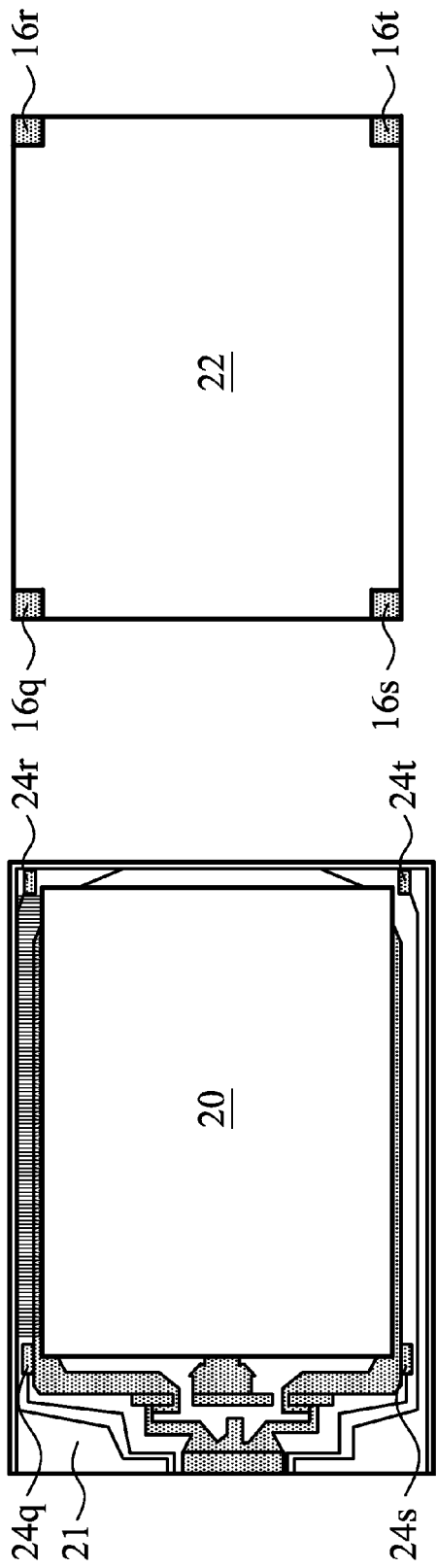
FIG. 6A
FIG. 6B
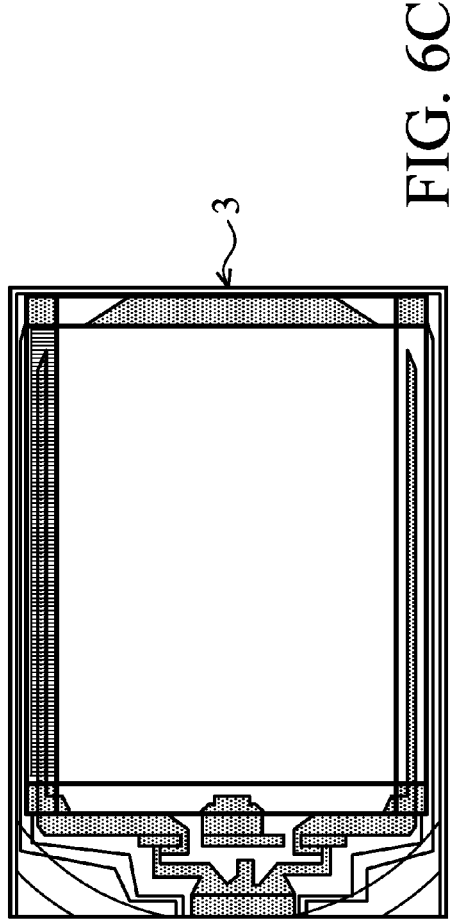
FIG. 6C

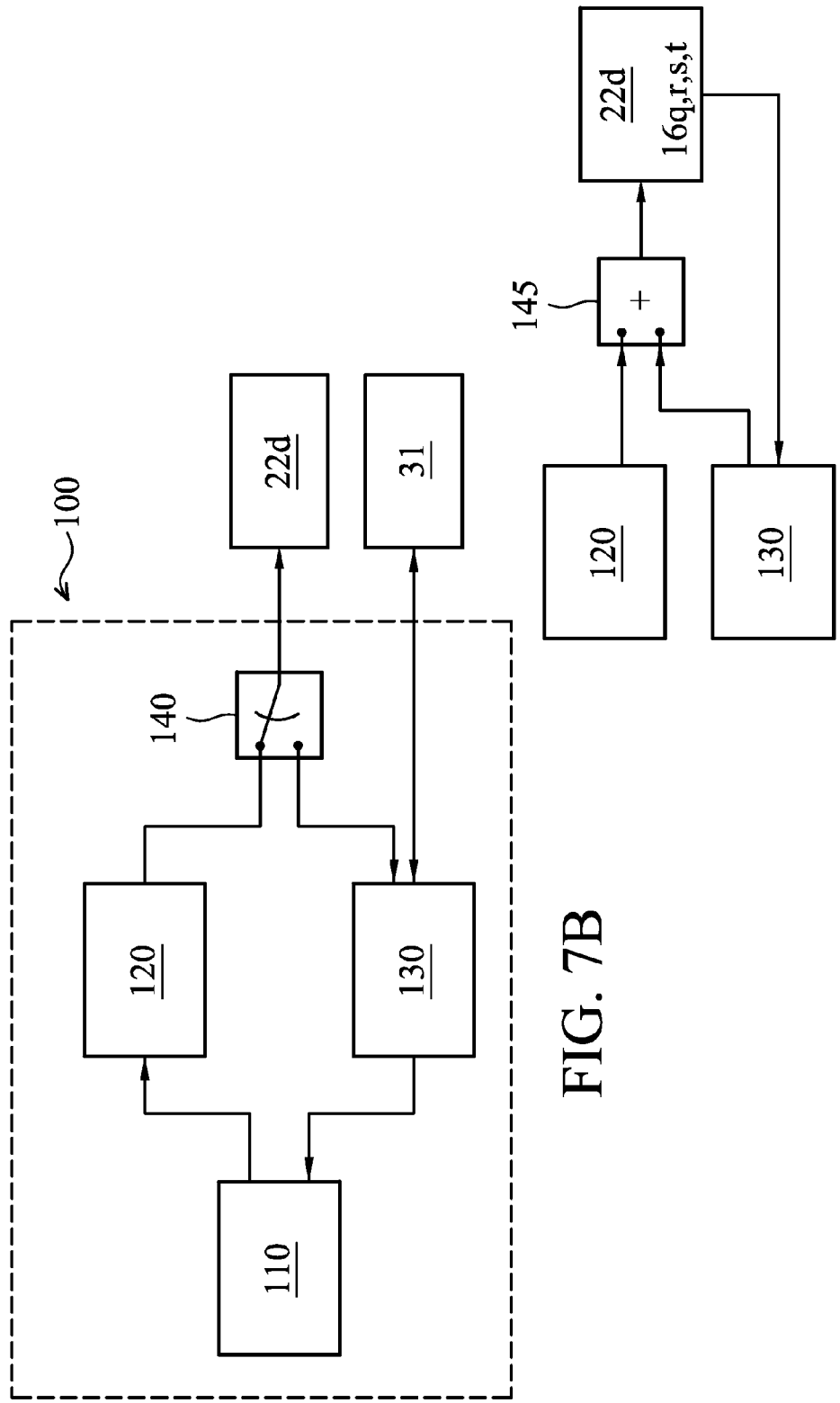

A-A'

ELECTRONIC DEVICE WITH A TOUCH SENSITIVE PANEL, METHOD FOR OPERATING THE ELECTRONIC DEVICE, AND DISPLAY SYSTEM

TECHNICAL FIELD

The present invention relates to an electronic device with a touch sensitive panel. The present invention further relates to a method for operating such an electronic device. The present invention further relates to a display system comprising such an electronic device.

DESCRIPTION OF RELATED ART

An electronic display device that is arrangeable into one of at least an opened and a closed state during use is known in the art. For instance, such apparatus may relate to a mobile phone or an organizer, wherein the display is arranged as a flexible and collapsible body providing a compact structure in a stand-by state and a device with an increased display area during use. The collapsible display may be stored in a housing of the electronic apparatus, for example it may be rolled about a suitable roller. Alternatively, the collapsible display may be wrapped about a housing of the electronic apparatus. To be collapsible, the device comprises a deformable display panel wherein an active area conductive structure is substantially arranged along a front side of an active area. A periphery area adjacent the active area may be provided, typically comprising a frame structure for visually bounding the active area. The frame structure is also conformal to the display panel.

The thinner the display, the more compact it can be arranged. In practice it has been found that the minimum radius to which the display can be rolled may approximately be 50 times the thickness of the display.

It is desirable that a touch screen is integrated with the display. This allows the user to intuitively interact with the device. For mobile display applications the use of low power display solutions is highly preferred. This can be obtained by the application of display effects that are multi-stable, i.e., a picture is loaded on a display and stays on this display even when the power is switched off. This is possible using certain multi-stable display effects, like electrophoretics as for example provided by E Ink Corporation or SiPix Imaging, Inc., or liquid-behavior-powder as described by Bridgestone Corporation. Other bi-/multi-stable display effects include CTLC (Cholesteric Texture Liquid Crystal) and BiNem (Bistable Nematic).

In addition, the power consumption can be kept to a minimum by application of a reflective effect, in which the ambient light is used as light source, rather than using a power consuming backlight in combination with a power consuming non-multi-stable transmissive display effect like commonly used in Liquid Crystal Displays or emissive OLED. The reflective electro-optical effect is also beneficial considering its readability in sun-light environment, in which emissive display types are very hard to read.

When considering the application of a touch panel function in which activation is obtained by mechanical force, for example using a resistive type of touch panel function, or in general by touching with a finger, for example using a capacitive type of touch panel function, the display should be protected against ESD damage, which may be harmful for both the active area of the display and (part of) the periphery around the active area.

Since the active area and possibly parts of the periphery typically comprise a conductive structure substantially arranged along a front side to enable display operation this may help in shielding ESD. However, the conductive layer is, due to its function, typically limited to the active area. This may create problems for ESD effects that are generated outside the active area.

SUMMARY

It is a purpose of the invention to provide an electronic device having a touch sensitive panel and a method for operating such an electronic device allowing improved shielding against ESD effects.

In accordance with a first aspect of the invention an electronic display device is provided that is arrangeable during use into one of at least an opened and a closed state. The device comprises a deformable display panel having an active area and a periphery area adjacent the active area. The active area comprises an active area conductive structure substantially arranged along a front side of the active area; the periphery area comprises a frame structure for visually bounding the active area. A drive circuit is provided for driving the active area. The frame structure is conformal to the display panel and is electrically conductive. An insulator structure is provided between the active area conductive structure and the conductive frame structure, the insulator structure insulating the active area conductive structure from frame structure, the conductive frame structure arranged to thereby shield the active area against ESD damage.

In this way side parts of the display are protected against ESD damage and in addition, any capacitive effects due to holding the display by its frame are neutralized so that spurious touch effects from inadvertent (almost) touching of the sides of the display are prevented. This is especially important for mono-touch type of touch panels.

The electronic device may have two or more parts that are arranged movably with respect to each other, and a selection between the opened and the closed state of the electronic device may be made by arranging these parts in a first relative (closed) position, or in a second relative (opened) position.

Alternatively, the electronic device may be formed of a single, flexible part that can for example be rolled into a predetermined compact form.

Various options are available to provide for potentially different states of the touch sensitive panel. In an embodiment the touch sensitive panel is rollable. In another embodiment the touch sensitive panel is wrappable. In another embodiment the electronic device has a first and a second part that are mutually connected via a hinge, and wherein at least one of the first and the second part is provided with said at least one touch sensitive panel including the conductive frame structure.

In the latter embodiment the second part may comprise sub-parts that are connected to each other via a hinge and wherein in a closed state of the device the first part is arranged between said sub-parts.

Alternatively the parts may be slidably coupled to each other.

In an embodiment of the display system the touch sensitive panel is integrated with the display panel.

BRIEF DESCRIPTION OF THE DRAWINGS

These and other aspects are described in more detail with reference to the drawings. Therein:

FIGS. 1A, 1B schematically shows a first embodiment of an electronic device according to the first aspect of the invention;

FIG. 5 illustrates steps of a manufacturing method;

FIGS. 6A to 6C show in more detail the touch sensitive structure;

FIG. 7 schematically shows an embodiment of an electronic circuit to be coupled to a common electrode;

DESCRIPTION OF EMBODIMENTS

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes and sizes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element or layer is referred to as being "coupled to" another element or layer, it can be directly on, connected or coupled to the other element or layer or intervening elements or layers may be present. In contrast, when an element is referred to as being "connected to" another element or layer, there are no intervening elements or layers present. Like numbers refer to like elements throughout. As used herein, the term "and/or" includes any and all combinations of one or more of the associated listed items.

FIG. 1A, 1B schematically shows a first embodiment of an electronic device 1 according to the first aspect of the invention. The electronic device has a first and a second part 2, 4 coupled by hinge 6. The electronic device 1 has an opened state as shown in FIG. 1A and a closed state, shown in FIG. 1B and has a deformable touch sensitive display panel 10.

Figure 2:
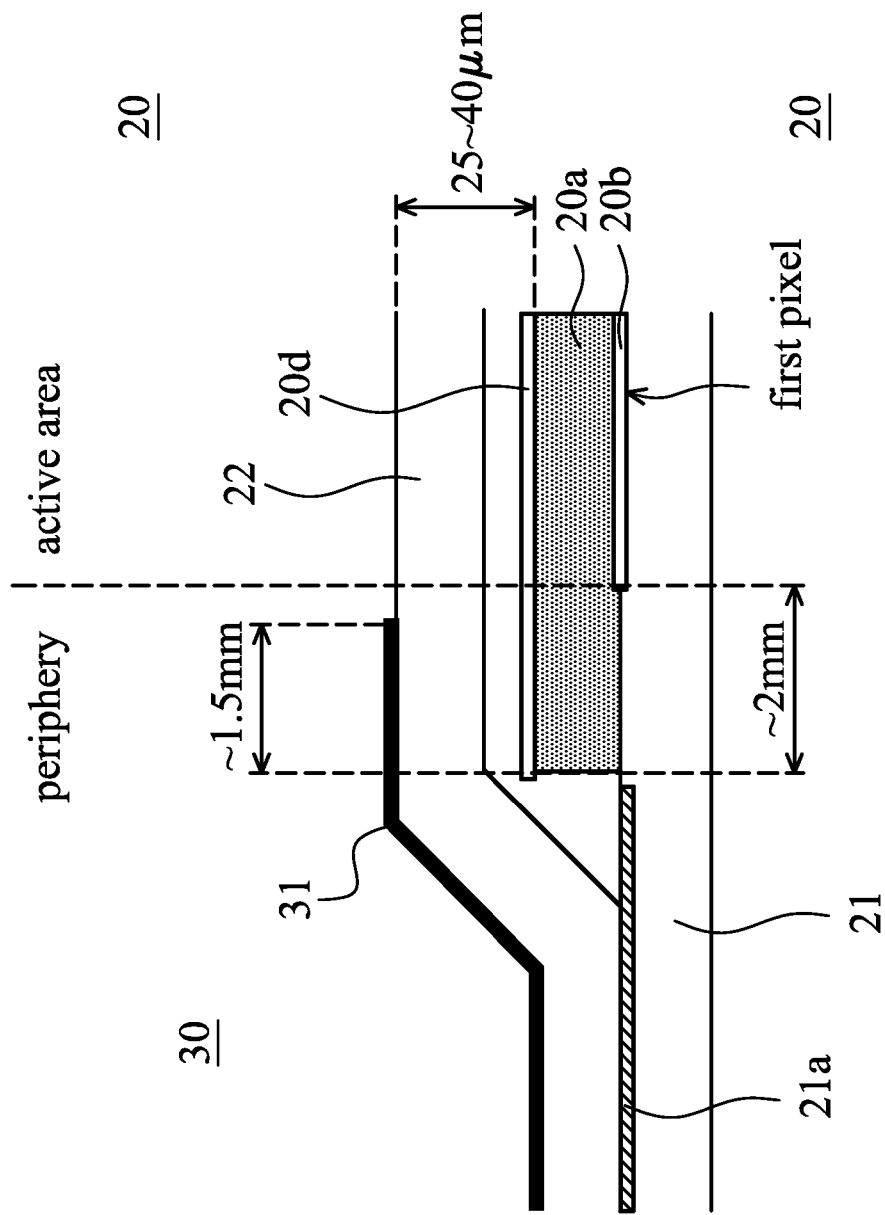
FIG. 2 shows a schematic side cross sectional view of a touch sensitive panel.

FIG. 2 shows a schematic side cross sectional view of a side of the touch sensitive panel 10 of, for instance, FIG. 1 or any other suitable device as further exemplified in subsequent figures. In this view, the deformable display panel has an active area 20 and a periphery area 30 adjacent the active area 20. The active area 20 comprises an active area conductive structure 20d substantially arranged along a front side of the active area. By this arrangement, the conductive structure 20d is substantially covering the active area 20, and by being arranged along the front side of the panel 10, the conductive structure forms (one of) the upper layer structures for the display panel 10, located substantially on the panel's front (display) side. The active area 20 is provided on a backplane 21, typically provided by an organic layer and including drive circuitry 20b coupled to interconnection circuitry 21a. The lower layer structures of the panel 10 are formed on the (typically inactive) back side. Frontplane 20a is covered by a shielding layer 22. The shielding layer 22 acts as a touch layer, together with the conductive structure 20d.

The periphery area 30 comprises a frame structure 31 for visually bounding the active area 20. The frame structure is conformal to the display panel 10. In order to be conformal, for example, the frame structure can be provided as a patterned layer of conductive paint, based, e.g., on carbon or silver dispersions having sufficient conductivity to prevent ESD damage when a person touches the panel and an electrostatic discharge takes place. The patterning can be provided by a stencilling or any suitable transfer. The frame structure can be electrical conductive by having a typical sheet resistance of printed layers that is in the range of 1Ω/☐ to 1 kΩ/☐, depending on material choice and dispersion density.

The disclosed solution to shield the display 10 including the peripheral area 30 for ESD has as an advantage that an extra top conductor layer covering both active and periphery area 20, 30 is not necessary, that would reduce transmission of the top layers, thereby decreasing the display properties. This also prevents cost and complexity to the system and prevents a structure that would make the periphery touch-sensitive. By the disclosed solution, spurious touch events when holding the display at the edge are effectively prevented.

By way of example, the periphery area can be adjacent to the active area in the following way. By design, the display medium may extend the actual active area 20 by ~2 mm on all sides. The frame structure 31 can be designed such that it also partly covers this extension, staying ~0.5 mm outside the active area 20. The overlap in the frame structure 31 and the active area conductor 20d of the display medium may then be ~1.5 mm. An insulator structure may be provided spanning a vertical distance between the top conductor 20d and the conductive frame structure. The insulator structure 22 thereby extends under the conductive frame structure 31, for example, by an insulator layer 22. The dielectric layer 22 may be a PET layer of 25~40 micrometer, which will make sure the display is fully shielded, because the aspect ratio of the overlap area is high (~50). The frame structure 31 can be made to run right to the edge of the display 10 by applying the frame structure 31 before cutting the display 10 to its final shape. Alternatively, it can be made to extend over an edge side of display 10, thereby also covering the sides of the display (not shown).

Figure 3A:
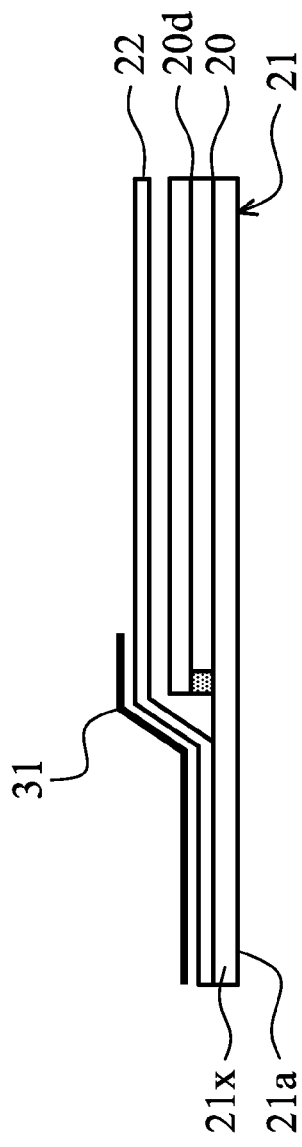
FIG. 3A schematically shows the panel in cross-section.
Figure 3B:
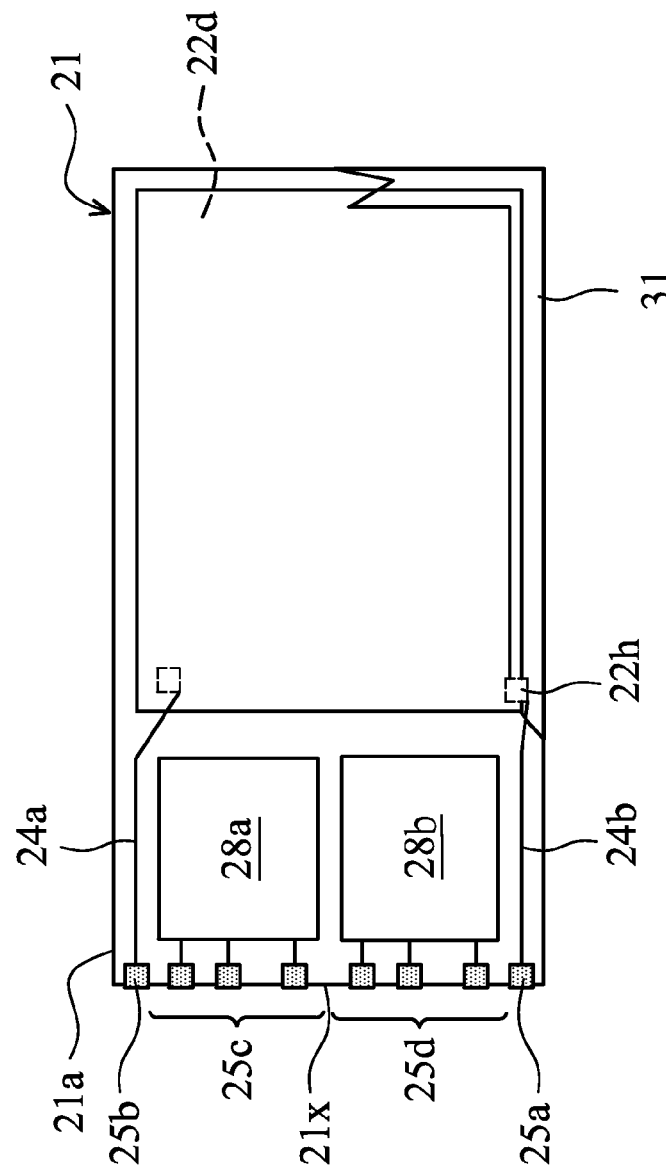
FIG. 3B schematically shows the panel in front view.

A further embodiment including an active area conductive structure 20d as a touch panel and a frame structure 31 is shown in FIGS. 3A and 3B. FIG. 3A schematically shows the panel in cross-section while FIG. 3B schematically shows the panel in front view. Parts therein corresponding to those in FIGS. 3A and 3B have the same reference number. For clarity's sake, the frame structure 31 is only depicted partly in the front view. A transparent protection film 22 or polymer structure e.g. a PET or PEN layer 22 extends over the entire front plane.

In the embodiment shown therein the substrate 21 has an extending portion 21a that extends in at least one direction beyond the display layer 20 and which is provided with electrically conducting elements 24a, 24b that couple active area conductive structure 20d in the active area 20 to respective contacts 25a,b at an edge 21x of the extended portion 21a. For clarity the display layer 20 is shown as a single layer. Nevertheless the display layer may be composed of a multiplicity of sub-layers as shown in more detail with reference to FIGS. 13A, 13B. In the embodiment of the electronic device shown in FIG. 3A, 3B, the extending portion of the substrate 21a is provided with address decoding elements 28a, 28b for addressing the display layer 20. The address decoding elements comprise a row decoder 28a and a column decoder 28b. This has the advantage that the number of contacts 25c, 25d at the edge 21x used for addressing the display layer is modest. Accordingly these contacts can be relatively large, which enables a simple and fast assembly to other components.

Figure 4:
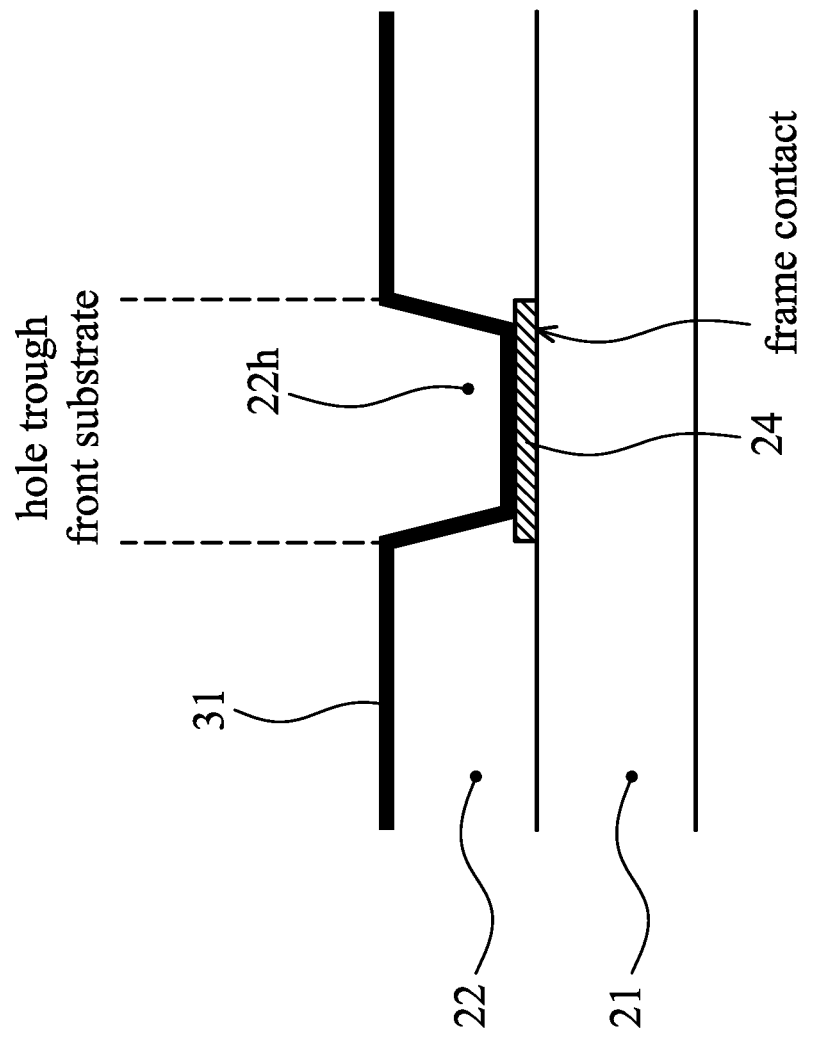
FIG. 4 shows an advantageous electrical connection of a frame structure to a backplane.

For grounding ESD currents impacting the conductive frame structure, FIG. 4 shows an advantageous electrical connection of the frame structure 31 coupled to a conductive structure substantially arranged along a back side of the display panel, in particular, to the backplane 21 to form an ESD grounding circuit, for example, as detailed in the FIG. 3. This can be achieved by creating contact sites 22h, typically, holes or cuts in the transparent protection layer 22 into which the frame material 31 may be deposited, for example, formed by a moldable conductive print. The ESD grounding circuit 24 is coupled to the conductive frame structure 31 by via structure 22h extending through the dielectric layer 22. Alternatively, contact between conductive frame material 31 and grounding electrode 24 can be made by a clamp on the frame or by bonding a small flex contact by using conductive glue.

A panel according to this embodiment can be very efficiently manufactured. Preferably such method as illustrated in FIG. 5 comprises the following steps.

In step S1, a first substrate 21 having said electrical conducting elements 24a, 24b is provided.

In step S2, a display layer 20 is applied on said first substrate 21.

In step S3, a conductive structure 20d is provided.

In step S4, a transparent protection film 22 or polymer structure e.g. a PET or PEN layer applied on said conductive structure 20d.

In step S5, the first substrate 21 is adhered to the second substrate 22 with the display layer 20 facing the pattern of electrically conductive material 20d. Preferably, at least a portion of the electrical conductor 20d is free of adhesive, to enable a resistive contact with the electrically conducting elements 24a, 24b in the substrate 21.

In step S6, the extending portion of the substrate 21a (FIGS. 4A, 4B) is provided with address decoding elements 28a, 28b for addressing the display layer. The address decoding elements comprise a row decoder 28a and a column decoder 28b.

The steps S1-S6 need not necessarily be executed in the order presented above. Alternatively steps S3 and S4 may be executed before steps S1 and S2, or steps S3, S4 may be applied concurrently with steps S1,S2.

FIGS. 6A to 6C show in more detail touch sensitive structure 22 (FIG. 6B) as described earlier with reference to FIG. 3C, is integrated with a display structure 20 on a substrate 21 (FIG. 6A) into a display panel 3 (FIG. 6C). In this embodiment the touch sensitive structure 22 has a layer 22 with a touch sensitive structure as shown in FIG. 3C. Portions 16q, 16r, 16s, 16t are electrically coupled to respective portions 24q, 24r, 24s, 24t of electrical conductors in an extended portion of the substrate 21.

In another embodiment a direct electrical contact of an electrically conductive layer 20d (not shown) of the touch sensitive structure 22 to the device is obtained via separate electrically conducting lines, without the need of electrically conducting regions on the display structure, for example by using electrically conducting wires or using a separate flex foil.

Figure 14A:
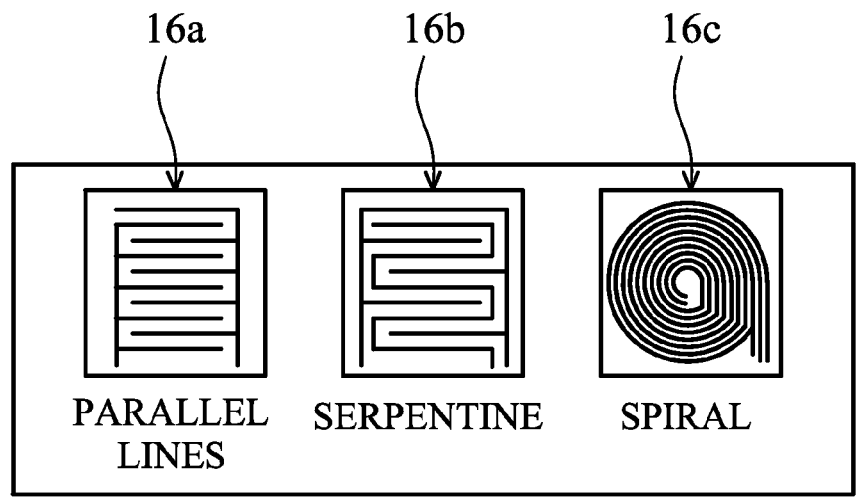
FIGS. 14A and 14B disclose various patterned touch sensitive layers.
Figure 14B:
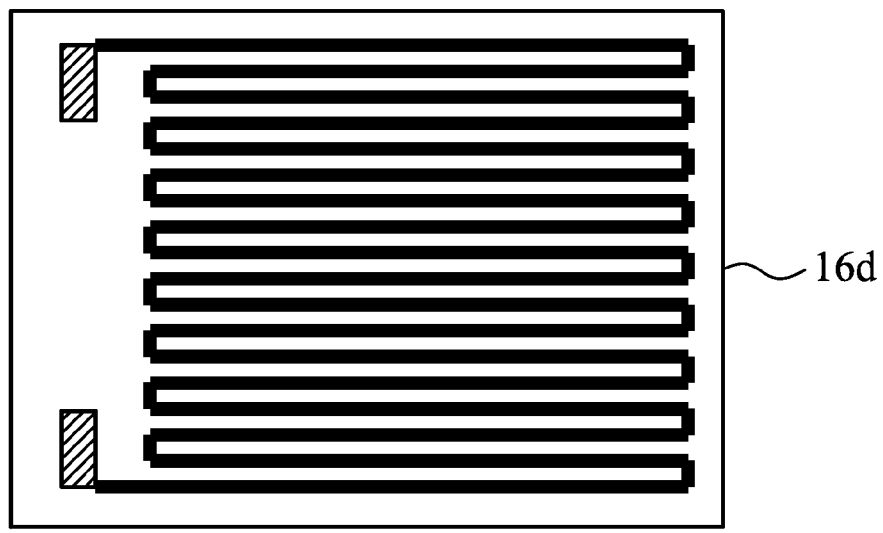

It should be noted that the electrode 20d has a double function, on one side to act as driving electrode for the display effect in the display structure 20, on the other side to act as electrode for the capacitive touch sensitive structure 22. It is not necessary that the electrode 20d is a homogeneous layer. Alternatively the electrode 20d may be applied in a patterned form, e.g. as shown in FIGS. 14A-14C. Although these embodiments are less sensitive to spurious touch events, as in the homogenous layer conductor 20d; ESD protection with a conductive frame structure may still be advantageous.

FIG. 7 schematically shows an embodiment of an electronic circuit to be coupled to the common electrode 22d. The electronic circuit 100 comprises the data processing facility 110 controlled by suitable application software for example. The data processing facility 110 controls display driver 120 for driving the common electrode 22d. The data processing facility 110 is further coupled to a touch screen driver 130 for driving the common electrode 18 and reading output signals from the electrode 22d. A switching element 140 alternatingly couples the display driver 120 and the touch screen driver 130 to the common electrode 22d. The switch is preferably alternated in a frequency range of 1 Hz to 100 Hz. At a lower frequency than 1 Hz, it could become visible to the user that the displayed information is updated discontinuously. At a frequency higher than 100 Hz, an interference may occur in the processing of the touch position, because the frequency with which the switching element 140 is alternated is too close to the frequency with which the touch screen driver 130 drives the common electrode 22d. When using a multi-stable display effect, such as the electrophoretic E Ink material, switching off the display driving system will not influence the image on the screen. The image will be retained because of multi-stability. The signals appearing on the common electrode when in touch-sensing-mode will also not influence the image on the screen because voltages can be rather small and frequencies will be beyond the response bandwidth of the electrophoretic display material, typically at least a factor 10 higher.

In another embodiment, shown in FIG. 7A, the switching element 140 is replaced by a superposition element 145 that superposes the driving signals from the display driver 120 and the touch screen driver 130 into a superposed signal for driving the common electrode 18.

The display driver 120 for example provides a constant voltage, and the touch screen driver 130 provides a high frequency signal. At feedback lines coupled to electrodes, e.g. 16q, 16r, 16s and 16t as shown in FIG. 6, output signals are measured indicative for a location of a pointing object near the screen. There will be no interference visible of the touch screen driving signals on the displayed images, provided that the high frequency signal has a frequency substantially higher than the response frequency of the display elements or in a range beyond the sensitivity frequency range of the human visual system.

Preferably, the sensor circuit 130 is electrically coupled to the conductive frame structure 31. In particular, the conductive frame structure 31a can be coupled to the signal generator 130 that generates the drive signal of the touch system 130 for active area conductive structure 20d, thereby also minimizing the influence of parasitic capacitances and thus preventing frame touches to interact with the conductive structure 20d. Also, the frame 31a might be used as return electrode for the touch system 130. For display driving, the frame structure 31a can either be coupled to the display top conductor 22d or just be left at ground potential.

Figure 8:
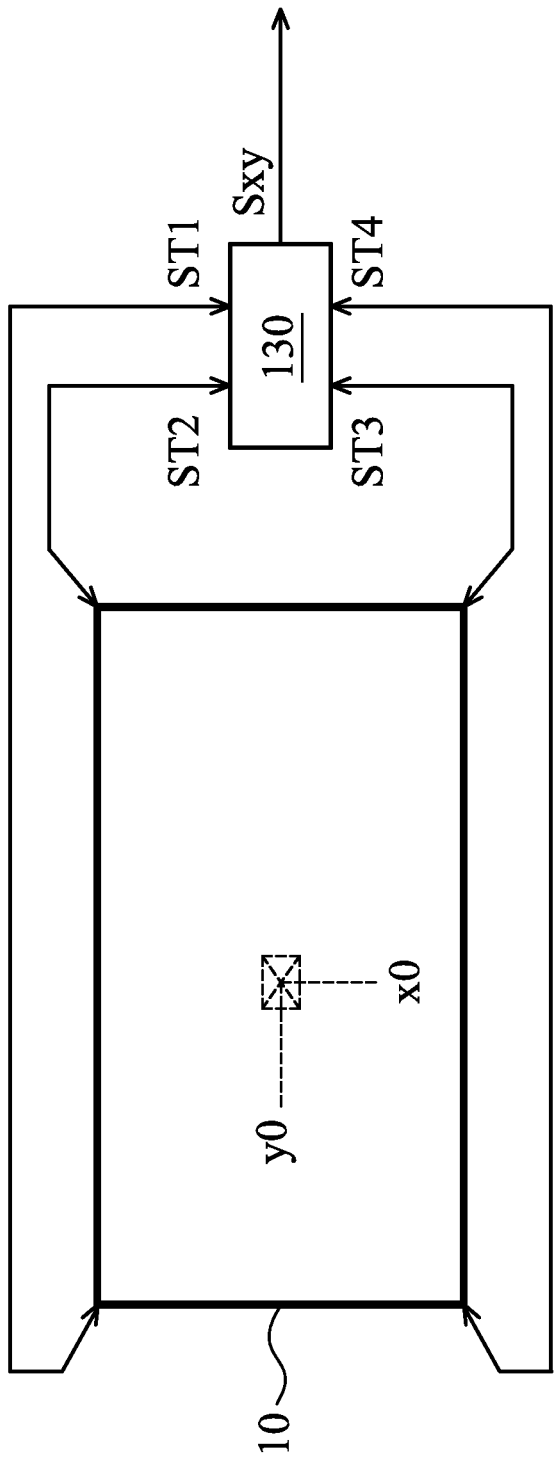
FIG. 8 schematically shows a sensor circuit 130 coupled to the touch sensitive panel.

FIG. 8 schematically shows a sensor circuit 130 coupled to the touch sensitive panel 10. The sensor circuit 130 is arranged for generating a touch signal Sxy indicative for a position x0 y0 where a touch of the touch sensitive panel 10 was detected, based on one or more signals ST1, ST2, ST3, ST4 from the touch sensitive panel 10.

Various methods are known as such for generating a touch signal Sxy using a touch sensitive panel 10 using a sensor circuit 130.

Figure 9A:
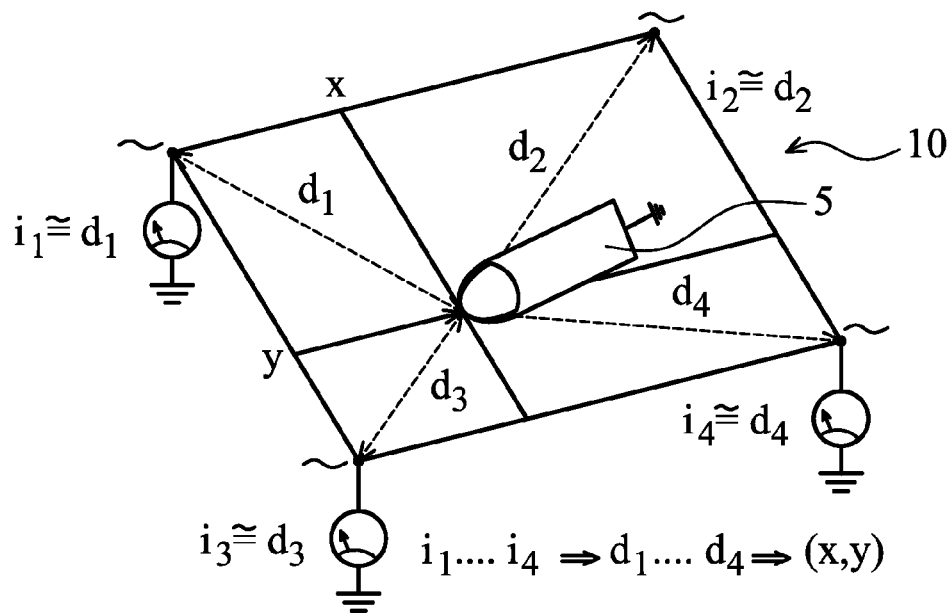
FIGS. 9A to 9C show a touch sensitive structure comprising a continuous electrically conductive layer and an insulating layer.
Figure 9B:
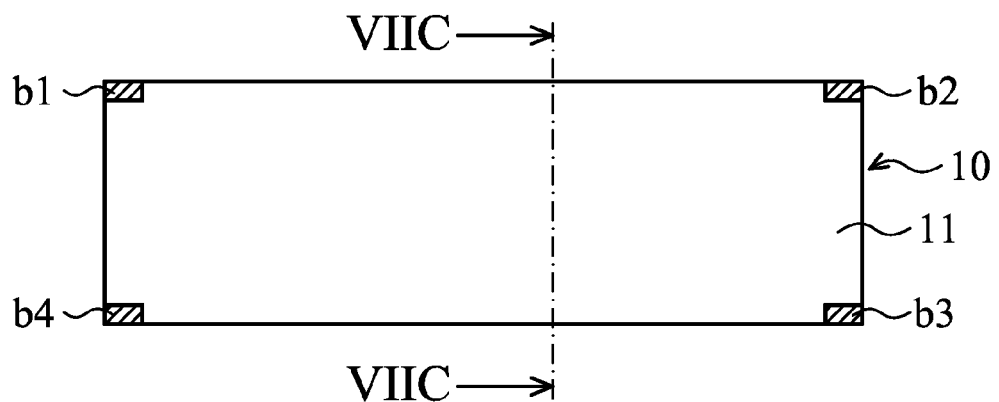
Figure 9C:

An example of a touch sensitive panel is a capacitive touch sensitive panel as shown in FIGS. 9A to 9C comprising a continuous electrically conductive layer 11 and an insulating layer 12. FIG. 9A shows a capacitive touch sensitive panel 10 according to a perspective view. FIG. 9B shows a top view of the electrically conductive layer 11 and FIG. 9C shows a side-view according to VIIIC-VIIIC in FIG. 9B.

The electrically conductive layer has corner contacts b1, b2, b3, b4 that are coupled to respective alternative voltage sources. When a finger 5 or other suitable pointing device touches the touch sensitive panel 10 different currents ST1, ST2, ST3, ST4 will capacitively leak away from said corner contacts b1, b2, b3, b4 depending on the distance from the point (x,y) where the panel is touched to said corner contacts. Accordingly the position (x,y) is estimated by the sensor circuit 130 from the measured currents by the following relationships:

$x=f(ST1, ST2, ST3, ST4)$ and $y=g(ST1, ST2, ST3, ST4)$

Figure 10:
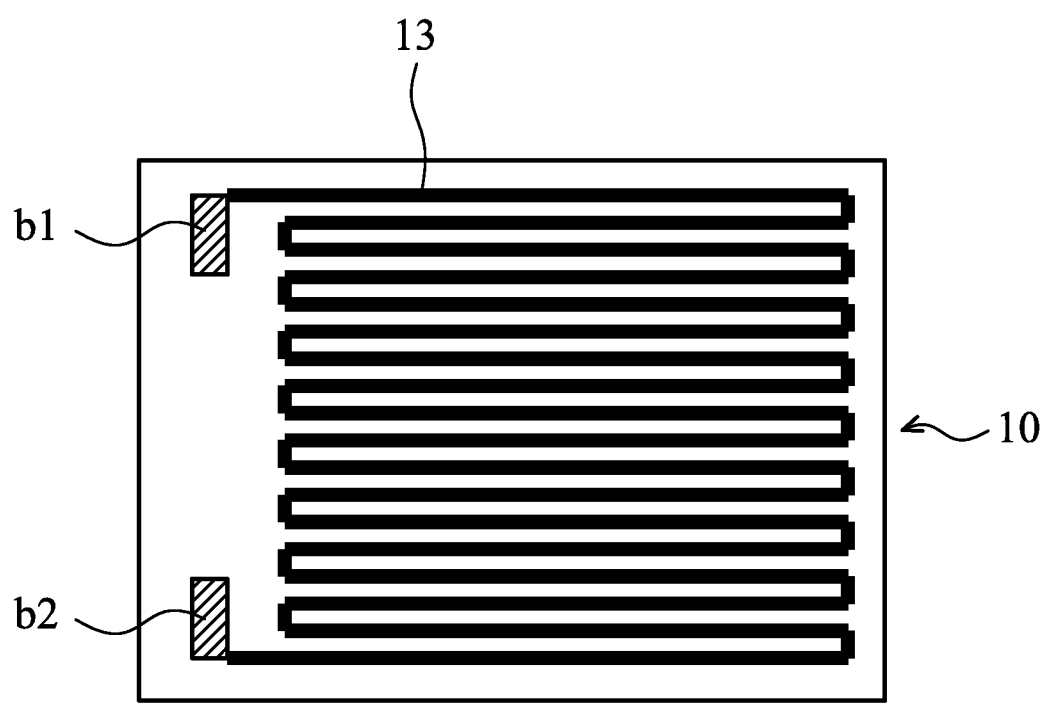
FIG. 10 shows another example of an electrically conductive layer.

FIG. 10 shows another example, wherein the electrically conductive layer of the touch sensitive panel 10 is configured as a meandering pattern 13, having a first and a second end b1, b2. In this case it holds that $x=f'(ST1, ST2)$, and $y=g'(ST1, ST2)$ Therein ST1, ST2 are the currents measured at the first and the second end b1, b2 of the meandering pattern. These, usually non-linear, relationships f, g, f', g' may for example be approximated by a polynomial function or by a lookup-table.

Figure 11A:
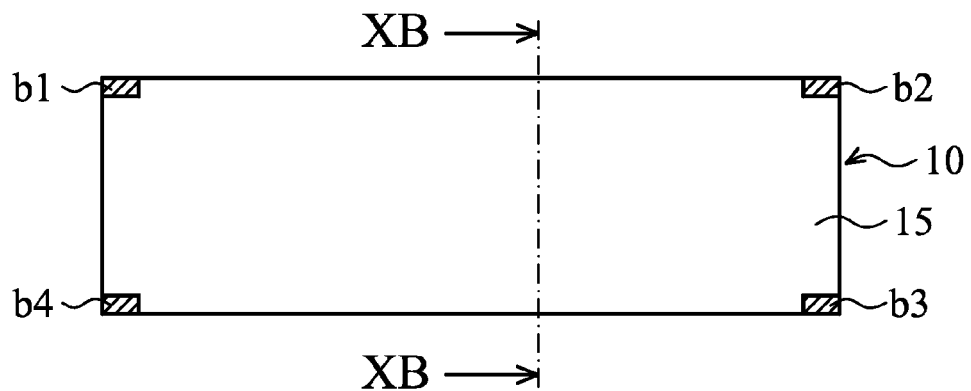
FIGS. 11A and 11B shows a top-view and cross-sectional view of a resistive touch sensitive panel.
Figure 11B:
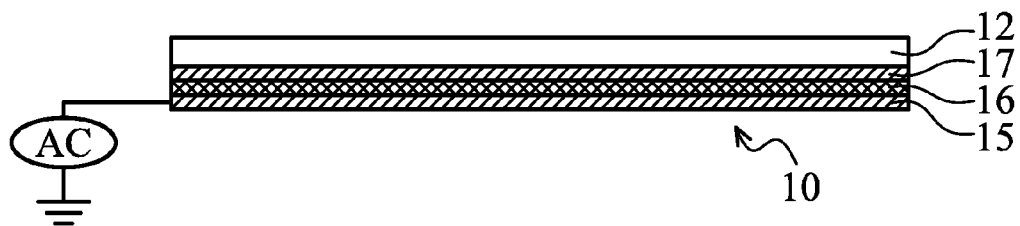

In another embodiment a resistive touch sensitive panel is used, as schematically shown in FIGS. 11A, 11B. FIG. 11A shows a top-view of the resistive touch sensitive panel 10, and FIG. 11B shows a cross-section according to XB-XB in FIG. 11A. As illustrated in FIG. 11B the resistive touch sensitive panel 10 has a first electrically conductive layer 15 having a relatively high conductivity and a second electrically conductive layer 17 having a relatively low conductivity, e.g. a conductivity that is at least 2 to 10 times as low as that of the first electrically conductive layer 15. The panel 10 further has a pressure sensitive layer 16 having conductivity that is locally determined by a local pressure exerted on the pressure sensitive layer. The pressure sensitive layer 16 is sandwiched between the first and the second electrically conductive layer 15, 17. The first electrically conductive layer 15 is coupled to an AC voltage source AC. The second electrically conductive layer 17 has corner contacts b1, b2, b3, b4 that are coupled to the pre-processing unit 21 to deliver signals ST1, ST2, ST3, ST4, similar as in the case with a capacitive touch sensitive panel 10 as shown in FIG. 9A-9C.

By way of example, FIGS. 1A and 1B shows an electronic device 1 having a first and a second part 2, 4 that are mutually connected via a hinge 6. In that embodiment, at least one part 4 is provided with touch sensitive panel 10.

Figure 12A:
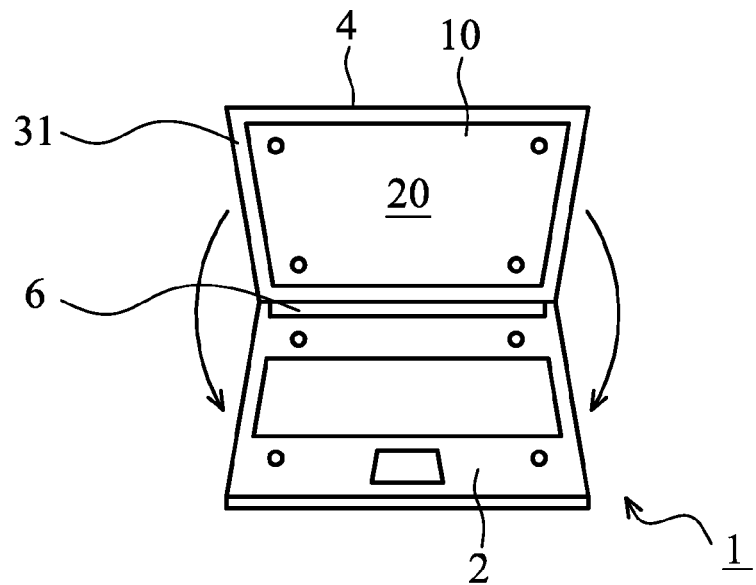
FIG. 12A shows an electronic device in perspective view.

FIG. 12A shows this configuration in perspective view, for a netbook or notebook computer, wherein the touch sensitive panel 10 is integrated within an active display area 20 with a conductive frame structure 31 as herein disclosed.

Figure 12B:
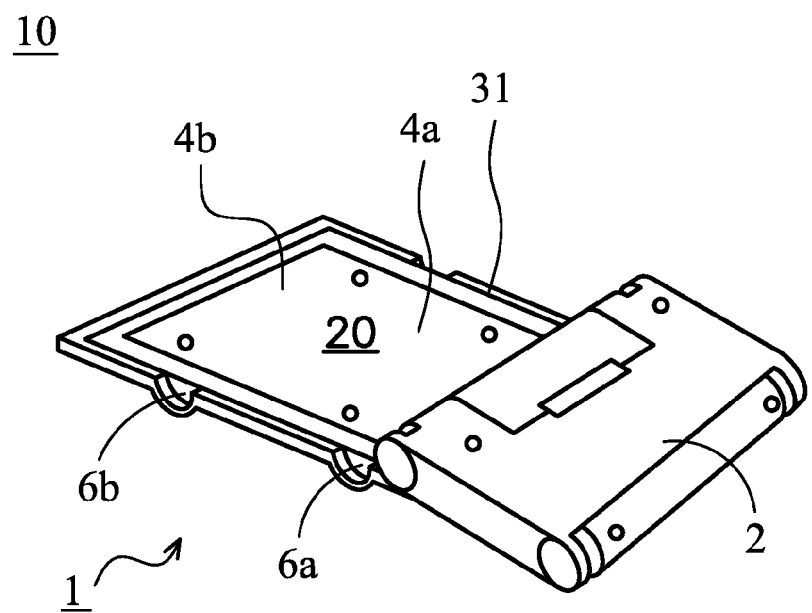
FIG. 12B shows a wrappable device.

FIG. 12B shows a wrappable configuration of the device 10. The device 10 comprises a main part 2 and further parts hingeably connected thereto. The device has a touch sensitive panel, integrated with active display area 20 with a conductive frame structure 31 as herein disclosed that is carried by the further parts 4a and 4b. Part 4a is coupled to main part 2 via hinge 6a, and part 4b is coupled to part 4a via hinge 6b.

Figure 12C:
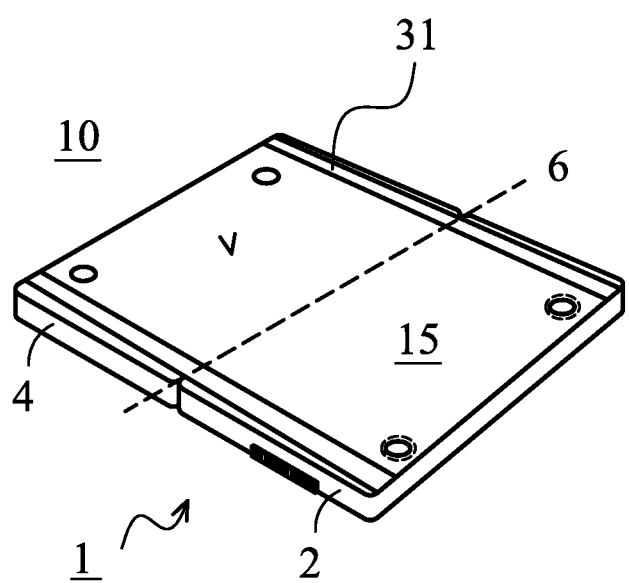
FIG. 12C shows a two part electronic device with hinge.

FIG. 12C shows a two part electronic device 1 with hinge 6, wherein the active display area 20 with a conductive frame structure 31 as herein disclosed and the touch sensitive panel integrated therein extends over the full area 20 defined by the parts 2,4. The electronic device 10 has a touch sensitive panel integrated into a deformable display 20 carried by parts 4a, 4b that can be folded like a book and wherein an extra cover 2 (e.g. holding a keyboard) can be slid or rotated between the display 15.

Figure 13A:
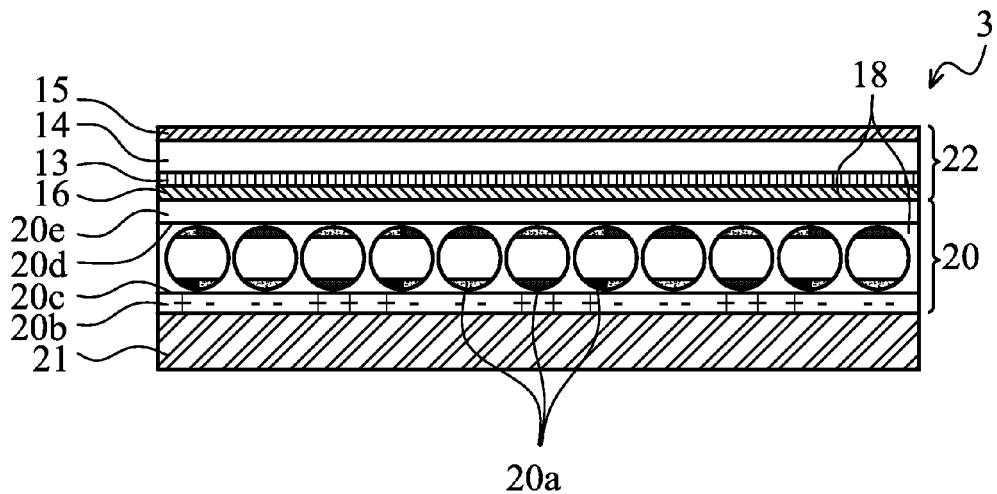
FIGS. 13A and 13B show embodiments of a flexible panel.

An embodiment of the flexible panel 3 is shown in FIG. 13A. As shown therein the panel includes a display structure 20 and a touch sensitive structure 22 that are arranged upon a flexible substrate 21 that is an insulator, e.g. a PET (Poly Ethylene Terephthalate) or PEN (Poly Ethylene Naphthalate) layer having a thickness of less than 50 micrometer, preferably less than 25 micrometer and more preferably less than 15 micrometer, e.g. 12.5 micrometer.

The display structure 20 is responsive to output signals Sout from the data processing facility. In the embodiment shown, the display structure 20 is reflection based. This is advantageous in that the display is well visible in sunlight. In particular the display structure 20 comprises a layer of multi-stable elements, here electrophoretic elements 20a. The electrophoretic elements 20a are controlled by individual electrodes 20c and a fixed electrode 20d. The individual electrodes 20c are driven by thin film transistors in a TFT layer 20b. An electrophoretic display has the advantage that only power is required to change the image content, not to maintain it. Electrophoretic materials are for example provided by E Ink Corporation or SiPix Imaging, Inc. These materials are relatively insensitive for UV-radiation, which allows for a broader range of manufacturing methods when integrating the display with other functional layers. Another technology using bistable elements is based on liquid-behavior-powder as provided by Bridgestone Corporation, as described in a "Development of Novel Bistable Display using Titania Composite" by Hiroaki Wada et al. downloaded from http://www.scientific.net.

Nevertheless, the display layer may be based on another display technology, e.g. CTLC (Cholesteric Texture Liquid Crystal) or BiNem™ (Bistable Nematic) or an emissive technology. For example the display layer may comprise other active display elements like OLEDs. This has the advantage that the display is also visible in dark environments.

The deformable display panel 3 further comprises a touch sensitive structure 22, comprising at least a first layer 16 with an electrically conductive structure. The layer 16 is arranged for providing input signals Sin to the data processing facility 8 indicative for a change of capacitance at a position where a pointing device approaches the panel.

Capacitive sensing is known as such from e.g. GB 1 464 095. Later examples of capacitive sensing are described in U.S. Pat. No. 6,452,514. Preferably the touch sensitive structure comprises an electrically isolating layer 14, to prevent a resistive contact between the pointing device, e.g. a finger or a stylus, and the first layer 16. Nevertheless the touch sensitive structure is also functional when the user merely maintains an air layer between the pointing device and the first layer 16.

In a favorable embodiment of the electronic device the touch sensitive structure 22 comprises at least a first and a second mutually capacitively coupled electrical conductor that are arranged in the first layer 16 and comprises a second electrically isolating layer 14. As shown in FIG. 14A, the first layer 16 is faced towards the display structure 20. As the mutually capacitively coupled electrical conductors are arranged in the same layer 16 the thickness can be relatively small, which is advantageous for the total thickness of the panel. In a preferred embodiment, the first and the second electrical conductor are mutually interlaced as is shown in FIG. 14A. E.g. the layer 16a applies an embodiment wherein the first and the second electrical conductor form comb like structures that engage one another. As a second example, layer 16b has a first electrical conductor in a dual comb like form, and a second electrical conductor that meanders between. As a third example, layer 16c has a first and second electrical conductor that are arranged in parallel along a spiral. In an embodiment the layer may have a larger plurality of electrical conductors. E.g., one pair of electrical conductors for each separate point to be identified in the plane of the panel, the layer 16 may have a pair of electrical conductors. For example, each pair of electrical conductors may identify a button for a particular selection. For use as a pointing device, a common pair of electrical conductors, or a single electrical conductor for the entire layer 16 is however preferred, in order to keep the number of connections to the layer low. It is not necessary that a plurality of electrical conductors is used. Alternatively the touch sensitive layer may comprise a single resistive line that meanders in layer 16d, as shown in FIG. 14B.

The capacitive touch panel is also capable to detect changes in electrical field when a pointing device approaches the panel without directly touching the panel. In this way a detection in the direction normal to the panel is possible, enabling additional input information.

Several options are possible for applying the pattern formed by the one or more electrical conductors in the layer 16.

Preferably, the layer 16 with electrically conductive structure is formed using a solution processable, electrically conductive polymer film, as the substrate 20 may degrade upon application of too high temperature or low pressure as needed in conventional sputter deposition of for example Indium Tin Oxide. Such a film can be structured via well-known process steps into the desired structures, needed for making a resistive touch panel work. For example, in case of using photochemical patterning of highly doped polyaniline (PANI) layer, one can pattern via deep-UV exposure through a mask, creating electrically conducting (<1 k$\Omega$/)) and electrically non-conducting regions (>1010 k$\Omega$/) as is described in more detail in G. H. Gelinck et al., Appl. Phys. Lett. 77, 1487-1489 (2000). If needed, an additional layer (not shown) can be placed between the electrophoretic foil 20 and the transparent electrical structure in layer 16, for example to act as barrier layer or as adhesion layer (See FIG. 2B), or another function. Other transparent, electrically conducting layer materials for the layer 16 may be used instead of polyaniline, for example polythiophene, polypyrrole or doped polymers. Apart from organic materials, various inorganic transparent, electrically conducting materials like ITO (Indium Tin Oxide), IZO (Indium Zinc Oxide), ATO (Antimony Tin Oxide), or Tin Oxide can be used. Other metal oxides can work, including but not limited to Nickel-Tungsten-Oxide, Indium doped Zinc Oxide, Magnesium-Indium-Oxide. Furthermore other transparent metal containing compounds can be considered as electrically conducting layer. The inorganic materials may be sputtered, evaporated, electrochemically applied, chemical vapour deposited or applied as nano-particles using well known solution coating techniques like spin coating, spray coating, slit-coating, or printing. Preferably, these nano-particles are in the form of nano-tubes, as a relatively low concentration thereof already results in a good electrical conductivity. The absorption of light by the particles in the layer 16 therewith is relatively low.

It may be advantageous to apply the electrically conductive structure in the layer 16 in a separate process and to subsequently apply the layer 16 to the display layer. In general, the film 14 is less sensitive than the display structure to some processing conditions like lower pressure, higher temperatures or UV light as needed in some deposition steps.

A transparent protection film 14 or polymer structure e.g. a PET or PEN layer, is applied on top of the touch sensitive layer 16, preferably using an adhesive layer 13. In a favorable embodiment the adhesive layer is a polyurethane layer. This material can be cured at a relatively low temperature (less than 70° C.). Nevertheless other adhesives may be applied, e.g. UV curable adhesives. The thickness of the transparent protection film 14 is preferably less than 150 µm, more preferably 25 to 50 µm, most preferably in the range of 12.5 to 25 µm. Optionally, the top substrate 14 can be provided with an additional optically functional, mechanically protective or chemical protective coating (15), like: anti-reflection, anti-glare, hard-coat, anti-smudge, UV-protection, protection against chemicals, anti-vapor etc. Application of such layers is well known as such. In general the additional layer 15 will have a thickness that is substantially less than that of the film 14.

Figure 13B:
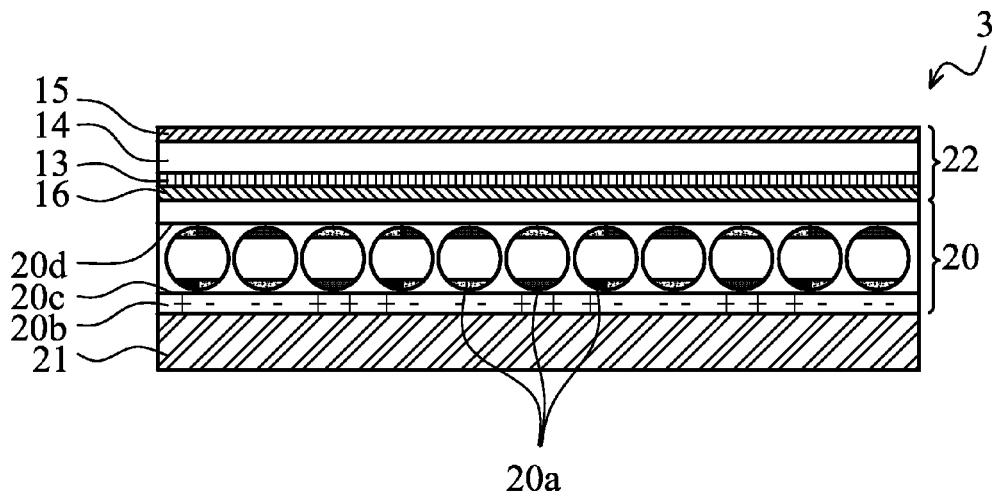

In a preferred embodiment, shown in FIG. 13B, the touch sensitive structure 22 is coupled by an adhesive layer 13 to the display layer 20.

Electrically conducting bus bars and tracks on 20 and 14 can be made by various conventional methods like printing, lithography, lift-off, deposition via a shadow mask, etc.

In the claims, the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage.

What is claimed is:

1. An electronic display device, said device being arrangeable during use into one of at least an opened and a closed state, said device comprising:

a deformable display panel used to form a touch sensitive panel and having an active area and a periphery area adjacent the active area, the active area comprising an active area conductive structure substantially arranged along a front side of the active area; the periphery area comprising a frame structure for visually bounding the active area, said frame structure being conformal to the display panel;

a drive circuit for driving the active area; and an electrostatic discharge grounding circuit, wherein:

the frame structure is electrically conductive and wherein an insulator structure is provided between the active area conductive structure and the conductive frame structure, the insulator structure insulating the active area conductive structure from frame structure, the conductive frame structure arranged to thereby shield the active area against electrostatic discharge damage;

the electrostatic discharge grounding circuit is coupled to the conductive frame structure, for grounding electrostatic discharge currents impacting the conductive frame structure;

the insulator structure is formed by a dielectric layer extending under the conductive frame structure, and the electrostatic discharge grounding circuit is coupled to the conductive frame structure by a via structure extending through the dielectric layer; and the conductive frame structure and the via structure are formed by a moldable conductive print.

2. The electronic display device according to claim 1, wherein the electrostatic discharge grounding circuit is coupled to a conductive structure substantially arranged along a back side of the display panel.

3. The electronic display device according to claim 1, further comprising a sensor circuit for generating a sensor signal (Sxy) indicative for a position where a touch on the active area conductive structure was detected, wherein the sensor circuit is electrically coupled to the conductive frame structure.

4. The electronic display device according to claim 3, wherein the sensor circuit has a signal generator that generates a drive signal that is applied to the conductive frame structure and the active area conductive structure, thus preventing frame touches to interact with the conductive structure.

5. The electronic device according to claim 1, wherein the touch sensitive panel is rollable.

6. The electronic device according to claim 1, wherein the touch sensitive panel is wrappable.

7. The electronic device according to claim 1, having a first and a second part that are mutually connected via a hinge, and wherein at least one of the first and the second part is provided with said at least one touch sensitive panel and wherein said second part comprises sub-parts that are connected to each other via a hinge and wherein in a closed state of the device the first part is arranged between said sub-parts.

8. The electronic device according to claim 7, wherein the first part is movably coupled to the second part by a hinge.

9. The electronic device according to one of the claim 7, wherein the first part is slidably coupled to the second part.

10. A display system comprising an electronic device according to claim 1 and further comprising at least one display panel.

11. The display system according to claim 10, wherein the touch sensitive panel is integrated with the display panel.

12. An electronic display device, said device being arrangeable during use into one of at least an opened and a closed state, said device comprising:

a deformable display panel used to form a touch sensitive panel and having an active area and a periphery area adjacent the active area, the active area comprising an active area conductive structure substantially arranged along a front side of the active area; the periphery area comprising a frame structure for visually bounding the active area, said frame structure being conformal to the display panel;

a drive circuit for driving the active area; and an electrostatic discharge grounding circuit, wherein:

the frame structure is electrically conductive and wherein an insulator structure is provided between the active area conductive structure and the conductive frame structure, the insulator structure insulating the active area conductive structure from frame structure, the conductive frame structure arranged to thereby shield the active area against electrostatic discharge damage;

the electrostatic discharge grounding circuit is coupled to the conductive frame structure, for grounding electrostatic discharge currents impacting the conductive frame structure;

the insulator structure is formed by a dielectric layer extending under the conductive frame structure, and the electrostatic discharge grounding circuit is coupled to the conductive frame structure by a via structure extending through the dielectric layer; and the conductive frame structure is disposed into the via structure extending through the dielectric layer to couple to the electrostatic discharge grounding circuit.

13. The electronic display device according to claim 12, wherein the electrostatic discharge grounding circuit is coupled to a conductive structure substantially arranged along a back side of the display panel.

14. The electronic display device according to claim 12, further comprising a sensor circuit for generating a sensor signal (Sxy) indicative for a position where a touch on the active area conductive structure was detected, wherein the sensor circuit is electrically coupled to the conductive frame structure.

15. The electronic display device according to claim 14, wherein the sensor circuit has a signal generator that generates a drive signal that is applied to the conductive frame structure and the active area conductive structure, thus preventing frame touches to interact with the conductive structure.

16. The electronic device according to claim 12, wherein the touch sensitive panel is rollable.

17. The electronic device according to claim 12, wherein the touch sensitive panel is wrappable.

18. The electronic device according to claim 12, having a first and a second part that are mutually connected via a hinge, and wherein at least one of the first and the second part is provided with said at least one touch sensitive panel and wherein said second part comprises sub-parts that are connected to each other via a hinge and wherein in a closed state of the device the first part is arranged between said sub-parts.

19. The electronic device according to claim 18, wherein the first part is movably coupled to the second part by a hinge.

20. The electronic device according to one of the claim 18, wherein the first part is slidably coupled to the second part.

21. A display system comprising an electronic device according to claim 12 and further comprising at least one display panel.

22. The display system according to claim 21, wherein the touch sensitive panel is integrated with the display panel.

\* \* \* \* \*